Patented July 5, 1949

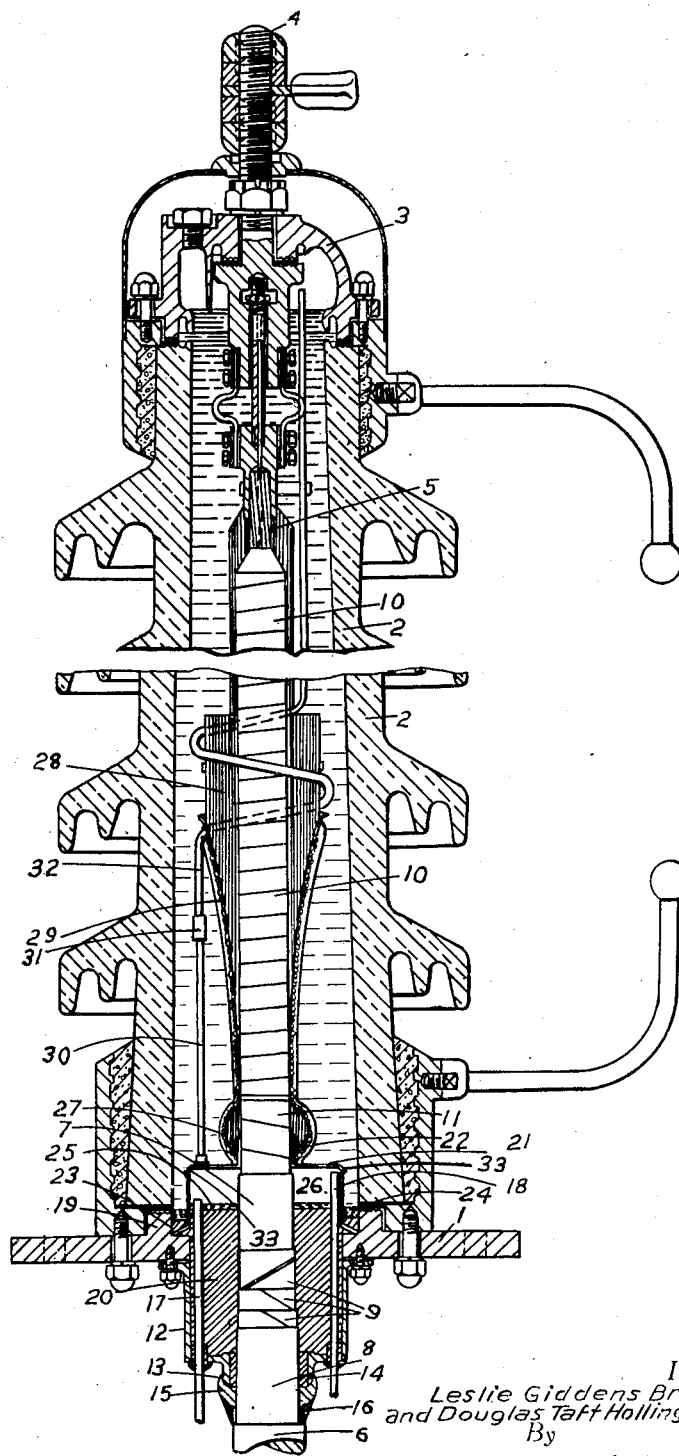

2,474,930

UNITED STATES PATENT OFFICE 2,474,930

SEALING END FOR HIGH-VOLTAGE ELECTRIC CABLES

Leslie Giddens Brazier and Douglas Taft Hollingsworth, London, England, assignors, by mesne assignments, to British Insulated Callender's Cables Limited, London, England, a company of Great Britain Application July 13, 1945, Serial No. 604,911
In Great Britain August 12, 1944

8 Claims. (Cl. 174—19.)

This invention is concerned with sealing ends for electric cables for working at very high voltages with gas pressure within the sheath of the cable and usually within the sealing end also. The invention deals particularly with means for sealing off the earthed parts of the cable at the lower part of the sealing end. It is required to connect such parts of the cable mechanically to the base plate of the sealing end and to close off the gas-containing wall so as to shut off the interior of the cable from the atmosphere. At the same time it is necessary to provide a gas entry chamber connected to the interior of the cable and serving as a way of supplying to the interior of the cable gas under pressure. These requirements are met by the present invention in combination in a single structural feature in an advantageous manner.

In the improved construction we follow the known practice of using a body of cast metal, often termed a "cast plumb" to close off from the atmosphere the gas-containing wall formed by the outer part of the cable and comprising a sheath or sheaths of lead or a lead alloy, or other suitable metal. Such a body of cast metal or cast plumb is formed by arranging a mould to enclose with a substantial clearance the parts to be joined, by filling this mould with a molten flux kept at a temperature above the melting point of the metal to be used and then pouring into the mould molten metal which displaces the flux in filling the mould up to the required height. In cooling, the metal solidifies and adheres to the metallic parts embedded in it and surrounding it. The metal used may be a lead-tin alloy, such as is used in making a wiped joint, but preferably is a lead-tin alloy of a composition which is approximately eutectic. Such a cast plumb provides a better joint than can be obtained by the wiping method in that there is less likelihood of porosity.

In accordance with the invention the container for the cast plumb is attached to the base plate of the sealing end and extends below. It is an inverted bell surrounding the cable and accessible from above the base plate. The gas entry chamber is formed by a second bell surrounding the cable above the base plate and having its edge embedded in the metal of the cast plumb so as to be securely held and sealed thereby. The space between the upper surface of the cast plumb and the top of the second bell (which forms the gas entry chamber) is in communication with the dielectric of the cable.

The cast plumb makes a secure connection between the metal sheath, or sheaths, of the cable and the base plate of the sealing end.

The inlet to the gas entry chamber is preferably provided by a pipe which passes upward through the bottom of the cast plumb into the space above it. The pipe is in this way sealed where it passes through an aperture in the wall of the container of the cast plumb. The end of this inlet pipe is preferably near the top of the space within the gas entry chamber. A second pipe with its upper end at a lower level in this chamber may also be provided to serve as a draining pipe to permit of any excess of compound, which may drain from the cable dielectric or the inside of the insulator of the sealing end into the gas entry chamber, being drawn off.

The second bell, by which the gas entry chamber is formed, has a cylindrical flange fitting closely round the screened dielectric of the cable and this flange is wrapped with an appropriate tape, or is otherwise sealed to the surfaces of the screened dielectric. To equalise the gas pressure within the cable with that within the sealing end a pipe may be provided extending from the top of the gas entry chamber to the upper region of the sealing end, reaching a point above the limit to which the sealing end is filled with compound. This tube, at least in its upper part, is formed of non-conducting material, for instance glass.

To enable the invention to be more fully understood and readily carried out the application of the invention to an outdoor sealing end for 132 kv. gas pressure cable, will now be described by way of example and with the aid of the accompanying drawing. Referring now to the drawing, which is a longitudinal section of the upper and lower parts of the termination, it will be seen that the sealing end consists, as usual, of a base plate 1, a long tubular porcelain insulator 2 mounted on the base plate and sealed to it and a cap 3 mounted on the upper end of the insulator and enclosing the connection between the terminal 4 and the cable conductor 5. The cable 6 extends upwards through an aperture in the base plate, the metallic outer part of the cable being removed from the greater part of the length which lies within the porcelain insulator. The cable in this example is of the kind in which there are two lead sheaths 7 and 8 with lappings of reinforcing tape 9 enclosed between them. The dielectric 10 of the cable is impregnated paper and there is the usual conducting screen 11 on the outer surface of the dielectric immediately under the inner sheath. Both sheaths are removed from a length of cable end slightly less than the length of the porcelain insulator. The screen continues over the dielectric for a short distance above the end of the inner sheath 7, which end lies a short distance above the base plate 1. The outer sheath is cut back to a lower point and the ends of the reinforcing tapes 9 lie between the ends of the two sheaths. The container for the lead plumb is an inverted cylindrical bell 12 bolted on to the under surface of the base plate 1 so that its interior wall lines up with the interior surface of a circular aperture in that base plate. The lower end of the bell has a cylindrical flange 13 extending downwardly outside the bell round the outer sheath 8 of the cable with a small clearance. This clearance is filled with suitable packing 14 and a wiped joint 15 is made between the outer end of the flange and the adjacent part of the sheath below it. The exposed part of the sheath below the wiped joint is protected by a tape poultice 16. Through the end wall of the bell are fitted two vertical pipes 17 and 18 extending to different levels above the upper surface of the base plate. On this upper surface is a vertical circular flange 19 having an internal diameter somewhat greater than the aperture in the plate. The space within this flange, the aperture and the bell serve as the mould for the cast plumb 20 which is made in the manner previously described herein.

The second bell 21 is made of sheet metal in the form of a short cylinder of approximately the same internal diameter as the hole in the base plate and having in its upper end a hole surrounded with an upstanding cylindrical flange 22 which is a good fit on the outside of the screen 11 on the cable dielectric. The lower end of the bell carries a number of tongues 23 which extend downwards and outwards from the edge of the bell and serve to support the bell on the base plate so that it registers with the opening therein.

After the metal has been poured into the mould for the cast plumb this second bell 21 is passed down over the cable end and pressed into the molten metal so that the tongues 23 and the lower edge of the cylindrical wall of the bell are immersed in the metal. With it is lowered an external ring which fits between the bell and the flange of the base plate and extends within this flange a short distance. The object of this ring is to produce a lower level of the cast metal outside the bell than inside. Its surface is such that the molten metal does not adhere to it. The bell and ring are held in place until the metal solidifies, after which the ring is removed. The annular space between the flange 19 and the bell 21 serves to receive a layer of viscous compound 24 which provides additional security against gas leakage. A layer 25 of similar compound may be provided on the top of the cast plumb within the gas entry chamber 26, and to permit this to be introduced, the bell may be made in two parts which are subsequently united by a soldered joint 33. The draining pipe 17 has its upper end slightly above the upper surface of such a layer of compound and the gas inlet pipe 18 has its upper end near to the top of the gas entry chamber. The inner sheath 7 of the cable terminates a short distance below the top of the chamber 26 and thus exposes a short length of the screen 11 on the dielectric 10 within the chamber. In this way communication is established between the gas entry chamber and the interior of the cable. Around the flange 22 upstanding from the top of the gas entry chamber is wrapped a poultice 27 of oil-resisting tape. This is continued a short distance above the flange so as to make an effective seal between this and the outer surface of the screen 11 on the cable dielectric. Beyond this point the cable end may be finished in the usual way by the reinforcing dielectric material 28 and the stress cone 29. It will be appreciated of course, that the pipes 17 and 18 will be furnished with valves to regulate the inflow of gas and draining off of compound, respectively.

Into the top of the gas entry chamber is secured a short length 30 of metal pipe extending upwards. At some point below the upper end of the stress cone this pipe 30 is connected by a sleeve 31 with a length 32 of glass pipe which takes a turn round the reinforced end of the conductor and goes up to and beyond the upper end of the porcelain insulator, thus establishing an equalising connection between the interior of the cap 3 on the insulator and the interior of the gas entry chamber 26.

What we claim as our invention is:

1. A sealing end for a super-tension gas pressure cable comprising an insulated conductor and a gas-containing wall surrounding said insulated conductor, said sealing end comprising a length of said cable from the end of which said gas-containing wall has been removed, a base plate having an opening for the passage of the cable therethrough, a tubular insulator mounted on said base plate, a closure member for the upper end of said insulator with means for connecting the cable conductor thereto, an inverted bell attached to said base plate and surrounding the cable below the base plate, a body of cast metal contained in said inverted bell and sealing the gas-containing wall of the cable to said base plate, a second bell surrounding the cable above the base plate and sealed at its upper end thereto at a point above the termination of the gas-containing wall thereof and having its lower edge embedded in said body of cast metal, compound in the annular space between the wall of said insulator and the second bell and the cable above said second bell, and means for feeding gas under pressure from an external source of supply into the interior of said second bell which is in communication with the interior of the cable.

2. A sealing end for a super-tension gas pressure cable comprising an insulated conductor and a gas-containing wall surrounding said insulated conductor, said sealing end comprising a length of said cable from the end of which said gas-containing wall has been removed, a base plate having an opening for the passage of the cable therethrough, a tubular insulator mounted on said base plate, a closure member for the upper end of said insulator with means for connecting the cable conductor thereto, an inverted bell attached to said base plate and surrounding the cable below the base plate, a body of cast metal contained in said inverted bell and sealing the gas-containing wall of the cable to said base plate, a second bell surrounding the cable above the base plate and sealed at its upper end to said base plate and having its lower edge embedded in said body of cast metal, compound contained in the insulator and surrounding said second bell and the cable above it, and an inlet pipe which passes upward through the body of cast metal and into the space above it enclosed by the said second bell, for feeding gas under pressure into the interior of said second bell and the interior of the cable of which the gas-containing wall is terminated within the said second bell.

3. A sealing end for a super-tension gas pressure cable comprising an insulated conductor and a gas-containing wall surrounding said insulated conductor, said sealing end comprising a length of said cable from the end of which said gas-containing wall has been removed, a base plate having an opening for the passage of the cable therethrough, a tubular insulator mounted on said base plate, a closure member for the upper end of said insulator with means for connecting the cable conductor thereto, an inverted bell attached to said base plate and surrounding the cable below the base plate, a body of cast metal contained in said inverted bell and sealing the gas-containing wall of the cable to said base plate, a second bell surrounding the cable above the base plate and sealed at its upper end to said cable and having its lower edge embedded in said body of cast metal, compound contained in the insulator and surrounding said second bell and the cable above it, an inlet pipe which passes upwards through the body of cast metal and has its upper end near the top of the said second bell, for feeding gas under pressure into the interior of said second bell and the interior of the cable of which the gas-containing wall is terminated within the said second bell, and a second pipe, which also passes upwards through the body of cast metal into the said second bell and which has its upper end at a lower level than the upper end of said inlet pipe, for removal of excess compound.

4. A sealing end for a super-tension gas pressure cable comprising an insulated conductor and a gas-containing wall surrounding said insulated conductor, said sealing end comprising a length of said cable from the end of which said gas-containing wall has been removed, an annular base plate surrounding the cable, a tubular insulator mounted on said base plate, a terminal cap on said insulator, an inverted bell attached to the base plate and surrounding the cable below the base plate, a body of cast metal contained in said inverted bell and sealing the gas-containing wall of the cable to said base plate, a second bell, forming a gas entry chamber, surrounding the cable above the base plate and sealed at its upper end to the cable at a point above the termination of the gas-containing wall thereof and having its lower edge embedded in the body of cast metal so as to be held and sealed thereby, a stress cone fitted to the cable above said second bell, and means for placing said gas entry chamber in communication with the interior of said cap, said means being a pipe which passes up through the compound contained in said insulator and of which at least the part projecting above the upper end of said stress cone is of non-conducting material.

5. A sealing end for a super-tension gas pressure cable comprising an insulated conductor and a gas-containing wall surrounding said insulated conductor, said sealing end comprising a length of said cable from the end of which said gas-containing wall has been removed, an annular base plate surrounding the cable, a tubular insulator mounted on said base plate, a terminal cap on said insulator, an inverted bell attached to the base plate and surrounding the cable below the base plate, an upstanding circular flange on the upper surface of said base plate having an internal diameter greater than the diameter of the aperture therein whereby to leave an annular face between said flange and said aperture, a second bell resting on said annular face and surrounding the cable above said base plate and sealed thereto at its upper end, a body of cast metal contained in said inverted bell and flanged base plate, sealing the gas-containing wall of the cable to the base plate and extending upwards beyond the lower edge of said second bell on both sides thereof, a pipe passing upwards through said body of cast metal and entering the chamber enclosed by the said body of cast metal and said second bell for feeding gas into the interior of the cable of which the gas-containing wall is terminated within said chamber, and compound contained in said insulator in the space between the insulator and the second bell and the cable above it.

6. A sealing end as specified in claim 5, wherein the said second bell carries a number of tongues which extend downwards and outwards from its lower edge and support the bell on said annular face in register with the opening in said base plate.

7. A sealing end for a super-tension gas pressure cable comprising an insulated conductor and a gas-containing wall surrounding said insulated conductor, said sealing end comprising a length of said cable from the end of which said gas-containing wall has been removed, a base plate having an opening for the passage of the cable therethrough, a tubular insulator mounted on said base plate, a closure member for the upper end of said insulator with means for connecting the cable conductor thereto, an inverted bell attached to said base plate and surrounding the cable below the base plate, a body of cast metal contained in said inverted bell and sealing the gas-containing wall of the cable to said base plate, a second bell surrounding the cable above the base plate and sealed at its upper end thereto at a point above the termination of the gas-containing wall thereof and having its lower edge embedded in said body of cast metal, and compound in the annular space between the wall of said insulator and the second bell and the cable above said second bell.

8. A sealing end for a super-tension gas pressure cable comprising an insulated conductor and a gas-containing wall surrounding said insulated conductor, said sealing end comprising a length of said cable from the end of which said gas-containing wall has been removed, an annular base plate surrounding the cable, a tubular insulator mounted on said base plate, a terminal cap on said insulator, an inverted bell attached to the base plate and surrounding the cable below the base plate, a body of cast metal contained in said inverted bell and sealing the gas-containing wall of the cable to the said base plate, a second bell surrounding the cable above the base plate and sealed at its upper end to the cable at a point above the termination of the gas-containing wall thereof and having its lower edge embedded in the body of cast metal so as to be held and sealed thereby, a stress cone fitted to the cable above said second bell, and means for placing the interior of said second bell in communication with the interior of said cap, said means being a pipe which passes up through the compound contained in said insulator and of which at least the part projecting above the upper end of said stress cone is of non-conducting material.

LESLIE GIDDENS BRAZIER.
DOUGLAS TAFT HOLLINGSWORTH.

No references cited.